F. W. DUSTAN.
FRUIT ASSORTING MACHINE.
APPLICATION FILED FEB. 3, 1915.

1,169,019.

Patented Jan. 18, 1916.
3 SHEETS—SHEET 1.

Witnesses
Edna Anderson
W. H. Wakefield

Inventor
Frederick W. Dustan
By Mason, Fenwick & Lawrence
Attorneys

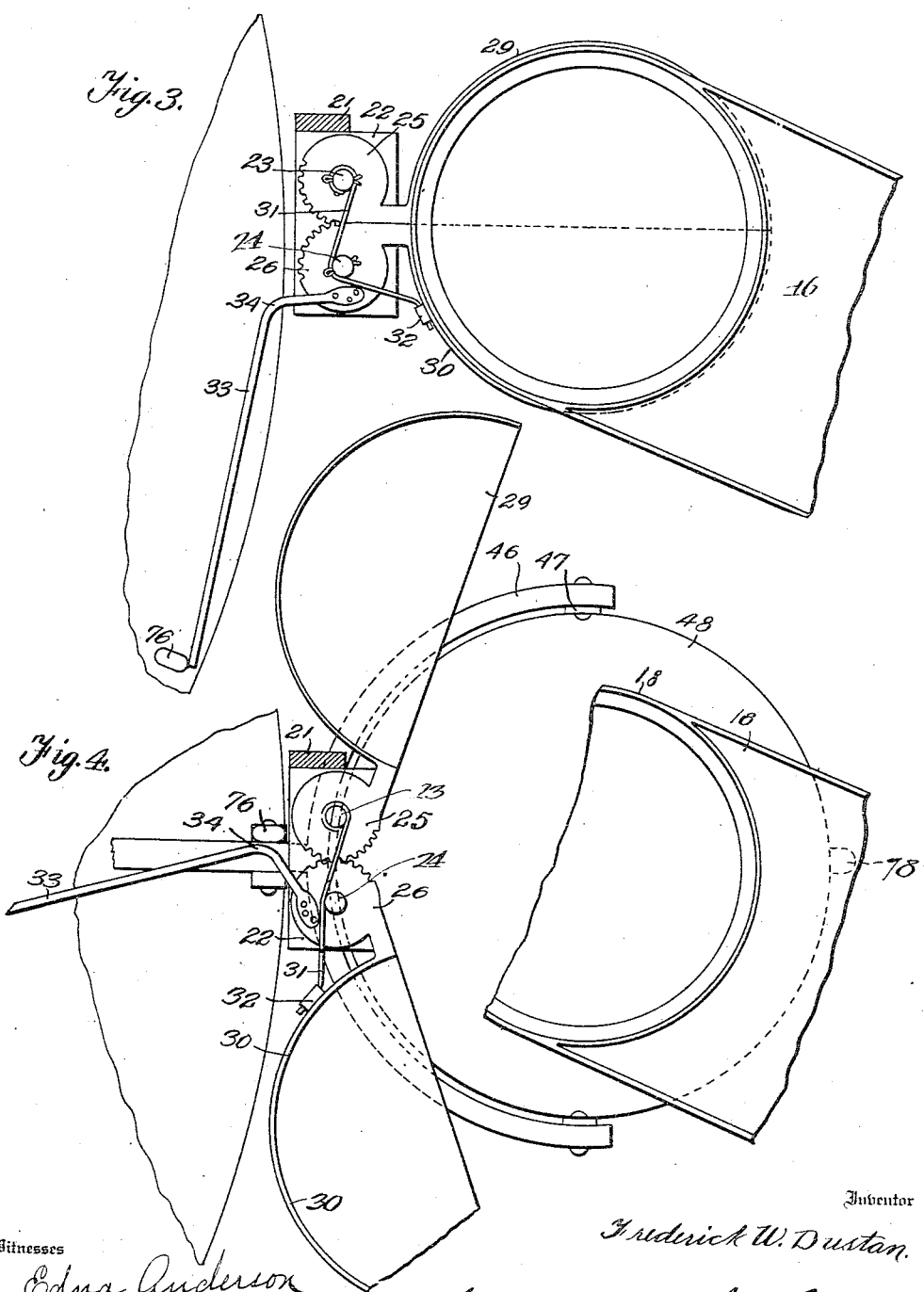

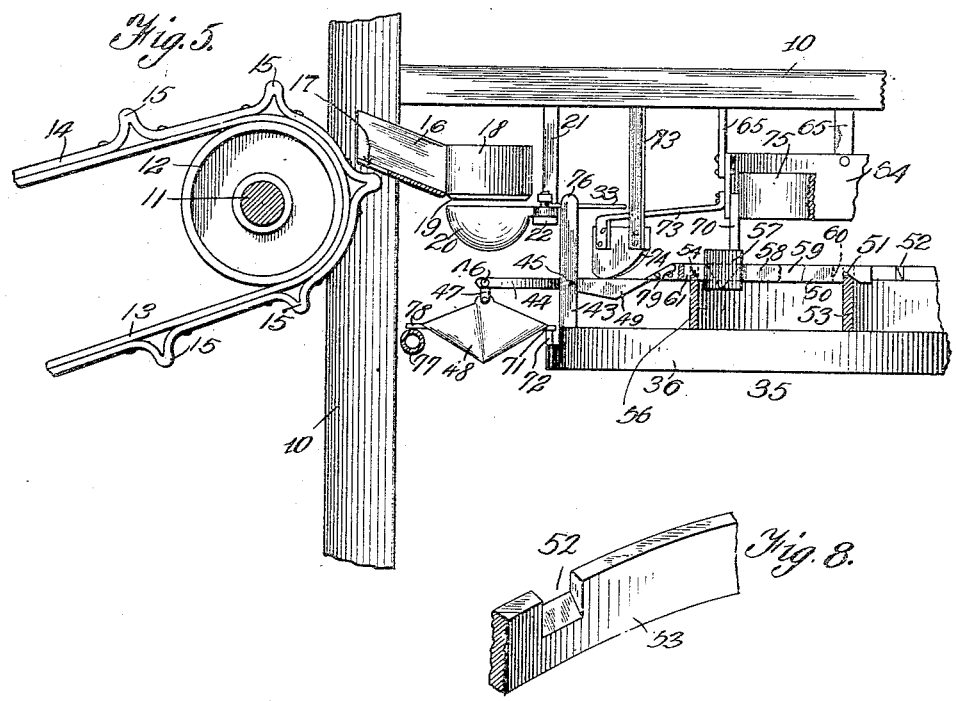

UNITED STATES PATENT OFFICE.

FREDERICK W. DUSTAN, OF CLARKSTON, WASHINGTON.

FRUIT-ASSORTING MACHINE.

1,169,019.

Specification of Letters Patent. Patented Jan. 18, 1916.

Application filed February 3, 1915. Serial No. 5,965.

*To all whom it may concern:*

Be it known that I, FREDERICK W. DUSTAN, citizen of the United States of America, residing at Clarkston, in the county of Asotin and State of Washington, have invented certain new and useful Improvements in Fruit-Assorting Machines; and I do hereby declare the following to be a full, clear, and exact description of the invention, such as will enable others skilled in the art to which it appertains to make and use the same.

This invention relates to improvements in fruit assorting machines and an object of the invention is to provide an economical and simple machine for rapidly assorting fruit of different weights.

Other objects of the invention are to provide a machine in the use of which no fruit will be lost, and wherein a maximum part of the time available is devoted to assorting.

The invention consists broadly in a conveyer including a belt, a chute, and a guide, and means for delivering the fruit piece by piece through the guide; a depositor beneath the guide consisting of a cup made in two halves, and means for opening the halves at intervals; a dropper including a rotary table carrying a number of buckets pivotally supported on the outer ends of rock levers whose inner ends are held down by beams and sliding weights which are moved automatically by means of cams as the table rotates, so that from time to time pieces of fruit of different weight may be dropped by the buckets; and a dumping mechanism consisting of a stop on the table supporting one end of each bucket and a skid over which the other end of the bucket rides at a time when it reaches the fruit from the depositor, these devices preventing the tilting of the bucket by the impact of the falling piece of fruit but permitting it when the proper time arrives and the inner arm of the rock lever is relieved from its weight.

In carrying out this broad principle, the invention resides in the combination and arrangements of parts described and hereinafter claimed.

Figure 1:
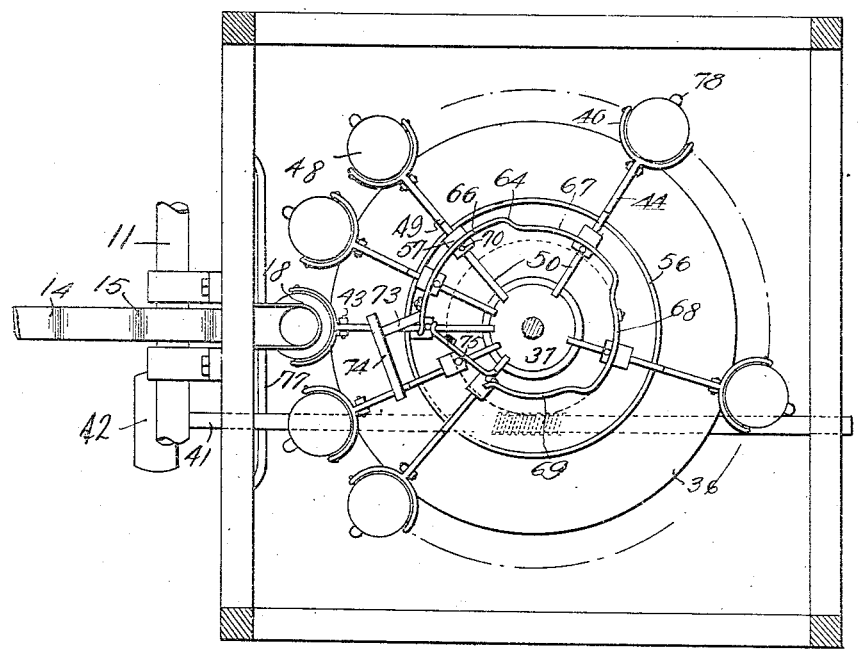
Figure 2:
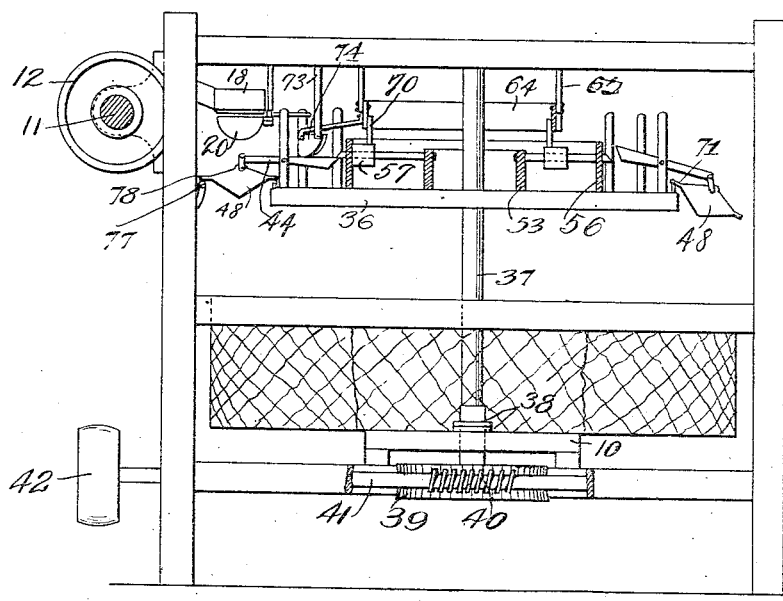

In the accompanying drawings, wherein but one form of the invention is disclosed, Figure 1 is a top plan view of the machine, Fig. 2 is a side elevation, the assorting member being shown in section, Fig. 3 is a top plan view of a fruit depositor such as may be used in the present invention, shown in closed position, Fig. 4 shows the depositor in open position, and the relative position of the fruit dropper together with the delivery chute, Fig. 5 is an enlarged side elevation of one end of the assorting member, certain parts of the invention being shown in section, Fig. 6 is a detail showing a beam such as is used in the disclosed machine, Fig. 7 is a fragmentary view of a ring used in the disclosed machine for supporting the outer end of the beam, and, Fig. 8 is a view similar to Fig. 7 showing the ring supporting the inner end of the beam.

In the fruit packing industry there is need for a simple machine which will sort out the different sizes of fruit so that pieces of fruit of the same size may be packed together to give a uniform appearance. The present invention aims to accomplish this result by providing a machine for separating the fruit according to weight. This is done by employing a lever, one end of which supports the fruit carrying bucket while the other end is acted upon by a pressure which varies, so that at times prior to sorting this pressure overcomes the weight of the fruit and at other times (at the moment of sorting) the fruit overbalances the pressure. There are various ways in which this principle can be employed for sorting fruit, and I do not wish to be limited to the particular construction disclosed in the drawings. The machine comprises a supporting frame, 10, upon which is journaled a shaft, 11, carrying pulley, 12, about which moves a fruit conveyer belt, 13. For the present invention it is immaterial how the belt or pulley is driven. Because of the nature of my assorting machine, it is desirable to deliver thereto one piece of fruit at a time, and to accomplish this there is an auxiliary strip of leather, canvas or other material, 14, riveted, or otherwise secured to belt, 13, so as to form separators, 15, each of which delivers one piece of fruit. Placed in juxtaposition to the pulley, 12, is a chute, 16, having the floor cut away as at 17 to receive the separators, 15, which pass between the parallel sides of the chute. Secured to the chute is a cylindrical guide, 18, the bottom of which may be tapered as at 19, to prevent bruising of the fruit. It is found, however, that the fruit, being of different sizes, will roll unevenly down the chute, 16, and in order to insure a positive and periodic delivery of the fruit, there is provided a depositor designated generally at 20, and shown in detail in Figs. 3 and 4. Depending from the frame is a support, 21, having a horizontal extension, 22, from which upstand spaced trunnions, 23 and 24, respectively, and about which turn mutilated, meshing gears 25 and 26, respectively. Integral with the gears are complementary sections, 29 and 30, respectively, which form a cup shaped depositor when in closed position, as shown in Fig. 3. A resilient member, such as a spring, 31, extends from trunnion 23, around trunnion 24, and has sliding connection, as at 32, with section 30 of the depositor. The object of this spring is to cause gear 26 to rotate in one direction when said spring is released, and gear 25 in the opposite direction, thus opening the depositor, 20. The gear, 26, has rigidly connected thereto a cam rod, 33, which is bent, as at 34, for a purpose which will appear hereinafter.

The matter thus far described is for the purpose of depositing or delivering to the sorting element of the machine one piece of fruit at a time.

The sorting element of the machine is generally shown at 35, and comprises a table, 36, rotatably mounted upon a driven shaft, 37, supported by a ballbearing, 38, carried by the frame, 10. A spur gear, 39, is rigid with shaft 37, and engages the worm, 40, carried by the shaft, 41, which is driven by pulley, 42. This gives the steady rotation of the table necessary to the proper sorting of the fruit. It is immaterial how the pulley, 42, is driven.

The fruit is separated according to weight, by means of a number of dropper units distributed about wheel 36. As the units are identical, but one will be described. There is pivotally mounted upon each of the supporters, 43, carried by rotating table, 36, a lever, 44, pivoted at 45, and having its outer arm ending in forked members having the form of a semi-circle, as at 46, Fig. 4. Each end of the semi-circular arm has pivoted thereto a link, 47, and to the bottom of each of these links is pivoted one side of a dropper bucket, shown at 48. This bucket, which receives the fruit from the depositor, may be of any form and is shown conical for convenience. As the buckets all weigh the same, the weight of the bucket and its contained fruit will vary according to the weight of the contained fruit. Fruits vary in size approximately according to weight, and this invention aims to assort the different sizes of fruit by means of their weight.

As the table rotates, some means must be provided for holding the dropper bucket and contents in raised position until they have been moved to the proper position for dumping the fruit and this means must change as the table rotates, to account for the different weights of the fruits handled. This is accomplished by having the other arm, 49, of the lever, 44, acted upon by a pressure which varies as the table rotates, being greatest at the start of the sorting operation and being least at the end of the sorting operation. The method of varying this pressure in the machine shown in the drawings, is to provide a removable beam, 50, having a notch, 51, in one end to be received by a slot, 52, formed in the top of an inner ring, 53, carried by the table. The slot prevents lateral movement of the adjacent end of the beam, 50, while the notch prevents longitudinal or inward movement toward the center of rotation. The outer end of beam, 50, is notched, as at 54, and is received by slots, 55, formed in an outer ring, 56, carried by the rotating table. These slots 55, prevent lateral movement of the adjacent end of the beam, 50, and it will thus be seen that the beam is always held in position to engage arm, 49.

As shown in Fig. 6 the beam, 50, comprises two parallel spaced bars, 58 and 59, respectively, held together by blocks, 60 and 61, adjacent rings 53 and 56 respectively. These blocks serve as a reinforcement to the beam at the points which receive their respective rings. Weight 57 is movably mounted upon the beam and comprises two parallel side plates which engage the bars and a central guide which lies between the bars, 58 and 59, respectively. While this particular construction of weight has been shown, yet any form of weight may be employed when the pressure already mentioned is to be varied by means of weights.

Coming now to the means for varying the pressure, it will be seen from Figs. 1, 2, and 5, that a cam track 64, is employed and supported by brackets, 65, secured to the frame of the machine. This cam has a number of dwells indicated at 66, 67, 68 and 69, respectively, each of which is of less radius than the preceding dwell. Upstanding from weight, 57, is a friction rod, 70, the upper end of which engages the cam, 64. The cam, 64, is stationary, while the weight, 57, and rod, 70, move with the rotating table. It is, therefore, apparent that as the table rotates from starting position, the weight will remain in outermost position for part of the revolution, after which the cam, 64, will force rod, 70, and weight, 57, inwardly nearer the center of rotation and nearer the fulcrum of the lever 50, which is the notch, 51. The table will rotate farther with the weight in this new position, after which the weight will be given another inward movement, and so on, until the rod, 70, is in engagement with the last dwell, 69, in the machine illustrated.

It is apparent that as the weight moves inwardly the downward pressure of the outer end of the beam will diminish and hence, the pressure serving to depress arm 49, of lever, 44, will also diminish. Whenever the weight of the dropper, 48, and its contained fruit exceeds the downward pressure of the beam, the dropper, 48, will fall to discharge the fruit and the arm, 49, will be raised. Of course, the lightest pieces of fruit will not be sufficient to overbalance the downward pressure of the beam until the dwell of least radius has been reached, while the heaviest fruit will be able to overcome it at the first dwell. It is easily understood that the grades between the heaviest and the lightest will drop off as the weight arrives at the various dwells between that of the greatest and least radius. Convenient means are provided to hold the sorted fruit, such as canvas bags, one being provided for each dwell of cam 64. When the dropper falls, an extension, 71, rigid with its inner end will engage a stop 72 on the table and support the inner end of the dropper. By reason of the link, 47, however, the outer end of the member, 48, can drop to a point where the contained fruit can roll out.

After all of the fruit has been deposited, the arm, 49, will be in raised position, and in order to restore it to normal position there is provided a cam 74 supported by means of brackets 73, the upper part of the cam face being designed to engage the said arm, 49, when in raised position and causing the same to be lowered as the table continues to rotate. Snap catch, 79, is pivotally mounted upon the outer end of the arm, 50, to prevent upward movement of arm, 49, after the latter has been depressed by cam 74. It will be apparent, of course, that the last dwell 69 of cam, 64, must have been passed before the cam 74 comes into operation. It is also necessary to move the weight from its innermost position to its outermost position before the dropper will be ready to receive another piece of fruit. This is done by employing a resetting cam, 75, which stands between the ends of the cam track 64, about as shown in Fig. 1. Cam 64 engages the face of friction rod, 70, remote from the center of rotation of the table, whereas, cam 75 engages face of the rod adjacent the center of rotation. As the table continues to rotate, the weight is moved longitudinally of the beam, 50, to its outermost position. Of course, so far as sorting fruit is concerned, the machine is idle while the weights are being reset or returned and the arms, 49, are being depressed, as previously described; therefore, cams 72 and 75 should be made to do their work in as small a fraction of the rotation of the table, 36, as is practicable.

The means for operating the previously described fruit depositor so that the fruit is deposited only when the dropper bucket is below the depositor cup will now be described. Rising from the table is a trip finger, 76, of sufficient height to engage cam rod, 33, seen in Figs. 3 and 4. There is one of these fingers for each dropper, 48. When the end of cam rod, 33, is in the position shown in Fig. 3, the sections of the depositor are closed by the finger to form a cup to hold the fruit delivered from the chute. As table 36 continues to rotate, the finger 76 will move from rod, 33, and the restraining force thus removed from spring, 31, whereupon the latter will open the sections of the depositor to deliver the contained fruit (see Fig. 4). The mechanism is so timed that finger, 76, releases rod, 33, just as one of the buckets, 48, arrives under the depositor. As the unevenness of the fruit makes its delivery by conveyer belt, 13, uncertain, the depositor cup sections must be closed quickly before another piece of fruit has had time to fall into said depositor. This is done by having the fingers, 76, placed about the periphery of table, 36, so that as soon as the depositor has been released by one of them the following finger will almost immediately engage bent part of cam rod, 33, as at 34, to start the closing of the depositor against the action of spring 31. By having the bent portion, 34, close to gear 26, the sections 29 and 30 can be brought almost to closed position in a very short time. Thereafter, the cam rod, 33, will be held against the finger 76, by spring 31, and during the time that is required for the next finger to pass from the bent portion of cam rod, 33, to the end of said cam rod, 33, the fruit is forwarded from the conveying belt, 13, through the chute, 16, into guide 18, and down to the depositor. The mechanism is so timed, that one piece of fruit is delivered from the conveying belt each time a new dropper bucket arrives under the depositor.

As the fruit drops from the depositor into the dropper bucket, its inertia will naturally give a greater upward pressure to arm, 49, than would be the case after the fruit comes to rest, and in order to prevent the accidental discharge of the fruit by reason of this impact, the cam 74 is made long enough to engage the arm, 49, until the fruit has come to rest. If this be not resorted to, a supporting skid, 77, may be provided to engage the extension, 78, formed on the outer end of the bucket, 48, while the inner end has an extension 71 supported by stop 72 on the table. As seen in Figs. 1 and 2, this skid, 77, can be formed with a rising surface so as to raise the dropper, 48, sufficiently to take the weight off of lever 44. This last named expedient can be resorted to either independently of cam, 74, or in conjunction therewith, but when employed it serves as means for sustaining the dropper until the supporting lever mechanism thereof is tripped and the dropper descends, and then it serves as means for tilting the dropper and thus dumping its contents.

I claim—

1. A fruit assorting machine comprising a conveyer including a guide through which the pieces of fruit are fed, a depositor beneath said guide, a moving dropper adapted to pass under said depositor, means for opening the depositor to drop a piece of fruit into the subjacent dropper, and means for permitting the descent of the dropper and the delivery of the piece of fruit therein at one of several later points according to the weight of such piece.

2. A fruit assorting machine comprising a moving element, a series of droppers carried by such element, a depositor for delivering pieces of fruit to the droppers at a certain point, means actuated by said element for opening the depositor at said point, and means at successively later points according to the weight of the fruit for causing the dumping of the droppers.

3. A fruit assorting machine comprising a conveyer including a belt, a chute, and a guide through which the pieces of fruit are fed singly, a depositor beneath said guide, a moving element, a series of droppers thereon adapted to pass successively under said depositor, means for opening the depositor at intervals, and sorting mechanism for causing the delivery of pieces of fruit of different weight at different points.

4. A fruit assorting machine comprising a conveyer including a belt and a guide through which the pieces of fruit are fed singly, a depositor beneath said guide, a moving element, a series of droppers pivotally supported thereby and adapted to pass successively under said depositor, means for opening the depositor at intervals, means beneath said depositor for preventing the tilting of the subjacent dropper, and sorting mechanism for causing the droppers to deliver pieces of fruit of different weight at different points.

5. A fruit assorting machine comprising a depositor to which the pieces of fruit are fed singly, a moving element, a series of droppers carried thereby and adapted to pass successively under said depositor, means for opening the depositor at times to drop a piece of fruit into the subjacent dropper, means for sustaining said dropper at this point, means for permitting the descent of the dropper at later points according to the weight of the piece of fruit therein, and means for tilting said dropper as it descends.

6. A fruit assorting machine comprising a moving element, a series of pivotally supported droppers carried by such element, a two part depositor, means to automatically open its parts for delivering pieces of fruit to the droppers at a certain point, means at this point for sustaining the droppers as they receive the impact of the falling fruit, and means at successively later points according to the weight of the fruits for permitting the descent and causing the tilting of the droppers.

7. A fruit assorting machine comprising a movable table, a fruit dropper, a lever carrying it and pivoted in the table, means to deposit a single piece of fruit upon the dropper, a beam, one end of which is weighted for restraining the dropper lever against tilting, and means to lighten the said end to allow the dropper to dump as the table rotates.

8. A fruit assorting machine comprising a movable table, a fruit dropper, a lever pivoted in the table and whose outer arm carries said dropper, a beam pivoted in the table and having one end weighted and overlying the inner lever-arm for overbalancing the dropper and holding the same against dumping, and means to lighten said end as the table moves, so that the dropper may dump.

9. A fruit assorting machine comprising a rotating table, a fruit dropper, a lever carrying it and pivoted in the table, a beam pivoted in the table above the lever, a weight thereon overbalancing the dropper, and means to change the position of the weight on the beam as the table rotates.

10. A fruit assorting machine comprising a rotating table, a fruit dropper carried thereby, a weighted beam restraining the dropper against descending, means to reduce the restraining force as the table rotates, and means to dump the dropper as it descends.

11. A fruit assorting machine comprising a rotating table, a fruit dropper carried thereby, a beam, a weight mounted upon the beam and overbalancing the dropper and restraining the same against dumping, and a cam engaging the weight and having dwells at different distances from the center of the table to move the weight along the lever at predetermined intervals as the table rotates.

12. A fruit assorting machine comprising a rotating table, a fruit dropper carried thereby, a beam pivotally connected to the table and overlying the dropper, a weight mounted on the beam and overbalancing the dropper to prevent dumping of the latter, a rod on the weight, and a fixed cam in operative connection with the rod, adapted to move the weight as the table rotates, to a point where the weight will be overbalanced by the dropper and contained fruit.

13. A fruit assorting machine comprising a rotating table, a fruit dropper carried thereby, a ring mounted upon the table, a beam pivoted to the table and overlying said ring and in operative connection with the dropper, a weight slidable on the beam and adapted in one position to overbalance the dropper and contained fruit, and a fixed cam above the table coacting with and adapted to slide said weight, as the table rotates, to a position where the weight will be overbalanced by the dropper and contained fruit.

14. A fruit assorting machine comprising a rotating table, a fruit dropper carried on the periphery thereof, a lever operatively connected to the dropper and extending inwardly of the table, a pair of rings on the table having upright slots, a beam having notches engaging said slots and its outer end overlying the inner end of said lever, a weight carried by the lever, and adapted to overbalance the dropper and contained fruit in one position, and an overhead cam to move the weight inwardly as the table rotates to a position where the weight will be overbalanced by the dropper and the fruit contained therein.

15. A fruit assorting machine comprising a rotating table, a fruit dropper mounted upon the periphery thereof, a pair of rings on the table concentric with its axis, a beam pivoted at its inner end to the inner ring and overlying the outer ring, its outer end being connected operatively to the dropper, a weight mounted upon the lever between the rings and overbalancing the dropper in one position, and means to move the weight toward the inner ring as the table rotates to a position where the weight will be overbalanced by the dropper and contained fruit.

16. A fruit assorting machine comprising a rotating table, a pivotally mounted lever thereon, a fruit dropper carried by one arm of the lever, a pair of rings on the table, a beam pivoted at its inner end in the inner ring and having a notch in its lower edge engaging the outer ring, the outer end of the beam overlying the inner end of said lever, a weight slidable on the beam between said rings and serving in one position to overbalance the dropper, and means to move the weight as the table rotates to a position where the weight will be overbalanced by the dropper.

17. A fruit assorting machine comprising a rotary table, a lever pivotally mounted therein, a fruit dropper carried by one arm thereof, a beam pivoted in the table and having an arm thereof engaging the other arm of the lever, a weight slidably mounted upon the beam and having an upright rod, and a fixed cam with which said rod engages to move the weight toward the fulcrum of the beam as the table rotates.

18. A fruit assorting machine comprising a pivotally mounted lever, a fruit dropper carried by one arm thereof, a rotary table, a beam pivoted therein and one end of which overlies the arm of the lever, a weight slidably mounted upon the beam, and a fixed cam to move the weight along the beam as the table rotates.

19. A fruit assorting machine comprising a fixed guide, a depositor under the guide, means to open the depositor at intervals, a moving element, a series of droppers each including a bucket adapted to pass under the depositor and lever mechanism mounted on said element for pivotally supporting the bucket, means for tripping said lever mechanism at later points according to the weight of the fruit being sorted, and a stop on said element under the inner end of the bucket for causing it to tilt as it descends.

20. A fruit assorting machine comprising a depositor, means to open it at intervals, a rotary table, a series of droppers including buckets adapted to pass under the depositor and lever mechanism mounted on said table for pivotally supporting the buckets, means for tripping said lever mechanism at successively later points according to the weight of the fruit being sorted, extensions at the inner and outer ends of the buckets, the former overlying said table and causing the tilting of the buckets as they descend, and an inclined skid underlying the outer extension and located opposite the point where each bucket receives its piece of fruit from the depositor.

21. A fruit assorting machine comprising a rotary table, a series of droppers carried thereby and each including a rock lever pivotally supported on the table and having its outer arm forked, a bucket linked to the extremities of the fork, means for applying pressure to the inner arm of the lever, and means for varying the pressure as the dropper moves through its path, and means for depositing pieces of fruit individually in the buckets at a certain point; combined with means on the table for sustaining the inner ends of the buckets, and a fixed skid for sustaining the outer end of each bucket as it passes beneath said point, for the purpose set forth.

22. A fruit assorting machine comprising a rotating table, a lever pivotally mounted between its ends thereon, a fruit dropper carried by one arm of the lever, a two part beam one end of which presses on the other arm of the lever, a weight sliding on and between the parts of the beam to cause it to exert pressure on the second arm of the lever and hold the dropper from falling, and a cam to automatically move the weight and vary the pressure as the table rotates.

23. A fruit assorting machine comprising a rotating table, a pivotally mounted lever on the table, a fruit dropper carried by one arm of the lever, a beam movably mounted in the table and one end of which overlies the other arm of the lever, pressure means connected to the beam to overbalance the dropper, means to vary the pressure so that the weight of the dumping member and contained fruit will overbalance the said pressure, and means to guide the beam as it moves.

24. A fruit assorting machine comprising a rotating table, a pivotally mounted lever mounted on the table, a fruit dropper carried by one arm of the lever, a beam, means to mount said beam for bodily removal, one end of the beam overlying the other arm of the lever, means to create pressure between said overlying end and arm, and means to vary the pressure as the table rotates.

25. A fruit assorting machine comprising a rotating table, a fruit dropper carried thereon, means to dump the dropper as the table rotates, a two-part fruit depositor, and means to open the parts of the depositor when the dropper arrives thereunder.

26. A fruit assorting machine comprising a rotating table, a fruit dropper carried thereby, means to dump said dropper as the table rotates, a depositor above the path of the dropper, a rod for closing the depositor, and means adapted to engage the rod and hold the depositor in inoperative position until the dropper arrives under the depositor.

27. A fruit assorting machine comprising a rotating table, a fruit dropper carried thereby, means to dump the dropper as the table rotates, a depositor, means to hold the depositor substantially closed until the dropper arrives thereunder, and means to open the depositor as the dropper arrives under the said depositor.

28. A fruit assorting machine comprising a rotating table, a fruit dropper carried thereby, a conveyer, a depositor intermediate the conveyer and dropper, and means to hold the depositor closed until the dropper arrives thereunder.

29. A fruit assorting machine comprising a rotating table, a fruit dropper carried thereby, a lever pivotally mounted upon the table having one arm thereof connected to the dropper, means to restrain the dropper and lever against downward movement during part of the revolution of the table, means to release the restraining means from the dropper as the table rotates, causing the arm remote from the dropper to rise, and a fixed cam to depress said arm of the lever as the table continues to rotate.

30. A fruit assorting machine comprising a rotating table, a lever pivotally mounted thereon, a fruit dropper carried by one arm of the lever, means to lower said arm and dump the dropper as the table rotates, means to raise said arm and dropper as the table rotates farther, a catch to hold the parts in such last position, a skid to take the weight of the dropper from the first arm when raised, and means to automatically deposit a piece of fruit in the dropper when the latter is so supported.

31. A fruit assorting machine comprising a rotating table, a lever pivotally mounted thereon, a fruit dropper carried by one arm of the lever, means to lower said arm and dropper as the table rotates, means to raise said arm and dropper as the table rotates farther, a skid to take the weight of the dropper from the first arm of the lever when raised and means to deposit a piece of fruit in the dropper when the latter is so supported.

32. A fruit assorting machine comprising a rotating table, a lever pivotally mounted on the table, a fruit dropper carried by one arm of the lever, means to dump the dropper as the table rotates, a cam adapted to engage the other arm and raise the dropper, a depositor, and means on the table to open such depositor and cause it to deposit fruit in the dropper while the said other arm is still in engagement with the cam.

33. A fruit assorting machine comprising a rotating table, a lever pivotally mounted thereon, a dropper pivotally connected to one arm of the lever, means to lower said arm and dropper as the table rotates, a cam adapted to engage the other arm of the lever when in raised position to lower the same and raise the first arm and dropper, a skid to support one end of the dropper, and a stop on the table to support the other end of the dropper when the latter has been raised, and to take the weight thereof from the first arm of the lever.

34. A fruit assorting machine comprising a rotating table, a lever pivotally mounted thereon, a fruit dropper carried by the lever, means to hold the lever in normal position during part of the revolution of the table, means to release the lever as the table rotates farther, and means on the table to support the inner end of the dropper as the latter falls, the outer end of the dropper falling to drop the fruit.

35. A fruit depositor, comprising a pair of complementary members forming a cup when closed, meshing gears, one rigid with each member, a cam rod rigid with one gear, a resilient member interposed between the two members adapted to separate the latter, and means to alternately engage and release alternately, the cam rod to close and open respectively the two members.

36. In a fruit assorting machine, the combination with a rotary table having upstanding fingers around its periphery, a series of rock levers pivoted thereto, dropper buckets carried by their outer arms, weighted beams overlying their inner arms, and means for shifting the weight on said beams; of a two-part depositor overlying the path of said buckets at a certain point, a support on which its parts are pivotally mounted, intermeshing gears on the parts, a spring holding them normally open, and a bent cam rod on one gear engaged by said fingers to close the parts as the buckets pass successively beneath them.

37. In a fruit assorting machine, the combination with a rotary table having upstanding fingers around its periphery, a series of rock levers pivoted thereto, dropper buckets carried by their outer arms, weighted beams overlying their inner arms, and means for shifting the weight on said beams; of cams above said inner arms for resetting the rock levers after they have been tripped, catches on said beams engaging the inner extremities of said levers when so reset, a two-part depositor overlying the path of said buckets at a certain point, means for normally opening its parts, a cam rod actuated by each passing finger to close said parts as a bucket passes from beneath the depositor, and means for feeding pieces of fruit successively into the depositor.

In testimony whereof I affix my signature in presence of two witnesses.

FREDERICK W. DUSTAN.

Witnesses:
 FLETCHER DODD,
 W. H. WAKEFIELD.